United States Patent
Kaminsky et al.

(10) Patent No.: US 9,185,061 B2
(45) Date of Patent: *Nov. 10, 2015

(54) OFFLINE IM CHAT TO AVOID SERVER CONNECTIONS

(71) Applicant: International Business Machines Corporation, Armonk, NY (US)

(72) Inventors: David L. Kaminsky, Chapel Hill, NC (US); David M. Ogle, Cary, NC (US); Patrick J. O'Sullivan, Ballsbridge (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/140,761

(22) Filed: Dec. 26, 2013

(65) Prior Publication Data

US 2014/0108582 A1 Apr. 17, 2014

Related U.S. Application Data

(63) Continuation of application No. 11/341,934, filed on Jan. 26, 2006, now Pat. No. 8,676,899.

(51) Int. Cl.
*G06F 15/16* (2006.01)
*H04L 12/58* (2006.01)

(52) U.S. Cl.
CPC ............ *H04L 51/046* (2013.01); *H04L 12/581* (2013.01); *H04L 51/04* (2013.01)

(58) Field of Classification Search
CPC ....... H04L 51/32; H04L 51/04; H04L 12/581; H04L 29/06027; H04L 12/5692; H04L 67/104
USPC ......................................... 709/227, 206, 204
See application file for complete search history.

(56) References Cited

U.S. PATENT DOCUMENTS

| 8,676,899 B2 | 3/2014 | Ogle et al. |
| 2002/0156875 A1 | 10/2002 | Pabla |

(Continued)

OTHER PUBLICATIONS

U.S. Appl. No. 11/341,934, Non-Final Office Action, Nov. 4, 2008, 20 pg.
U.S. Appl. No. 11/341,934, Non-Final Office Action, May 26, 2011, 25 pg.

(Continued)

*Primary Examiner* — David Lazaro
*Assistant Examiner* — Charles Murphy
(74) *Attorney, Agent, or Firm* — Cuenot, Forsythe & Kim, LLC

(57) ABSTRACT

An instant message (IM) connection is established at an IM server in the usual manner, under the policies and security rules promulgated by the IM service provider. Using this connection to the IM server, an offline IM chat request is made at the IM server for establishing an offline connection directly between consenting IM clients. The request may be included in a message to the IM server from a client, or the request may be in the form of IM session parameter, for the client, that authorizes an offline chat as the preferred type of IM session under certain conditions. These conditions may result in the IM server being unavailable or may instead authorize the IM server to unload the client from an online session to an offline session based on IM server loading level or other factors that are under the control of the server. The conditions may also specify the presence of other IM clients as a criteria for establishing an offline chat; the clients may be present in an online chat session or merely available.

20 Claims, 4 Drawing Sheets

(56) References Cited

U.S. PATENT DOCUMENTS

| | | | |
|---|---|---|---|
| 2003/0126213 A1* | 7/2003 | Betzler | 709/206 |
| 2003/0177184 A1 | 9/2003 | Dickerman et al. | |
| 2003/0182428 A1 | 9/2003 | Li et al. | |
| 2004/0030750 A1 | 2/2004 | Moore et al. | |
| 2004/0054802 A1 | 3/2004 | Beauchamp et al. | |
| 2004/0064512 A1* | 4/2004 | Arora et al. | 709/206 |
| 2004/0249953 A1 | 12/2004 | Fernandez et al. | |
| 2005/0005014 A1 | 1/2005 | Holmes et al. | |
| 2005/0005030 A1 | 1/2005 | Asai | |
| 2005/0027810 A1* | 2/2005 | Donovan | 709/206 |
| 2006/0026239 A1* | 2/2006 | Chen et al. | 709/206 |
| 2006/0173960 A1 | 8/2006 | Zlateff et al. | |
| 2006/0256772 A1* | 11/2006 | Yarlagadda | 370/352 |

OTHER PUBLICATIONS

U.S. Appl. No. 11/341,934, Non-Final Office Action, Feb. 3, 2012, 20 pg.
U.S. Appl. No. 11/341,934, Final Office Action, Sep. 14, 2012, 27 pg.
U.S. Appl. No. 11/341,934, Non-Final Office Action, Dec. 17, 2012, 29 pg.
U.S. Appl. No. 11/341,934, Final Office Action, Apr. 8, 2013, 32 pg.
U.S. Appl. No. 11/341,934, Notice of Appeal and Appeal Brief, Jul. 8, 2013, 41 pg.
U.S. Appl. No. 11/341,934, Notice of Allowance, Oct. 23, 2013, 13 pg.
Stanek, W.R., "Monitoring Server Performance and Activity," Microsoft Windows 2000 Administrator's Pocket Consultant, 1999, Microsoft Corporation, 10 pg.

* cited by examiner

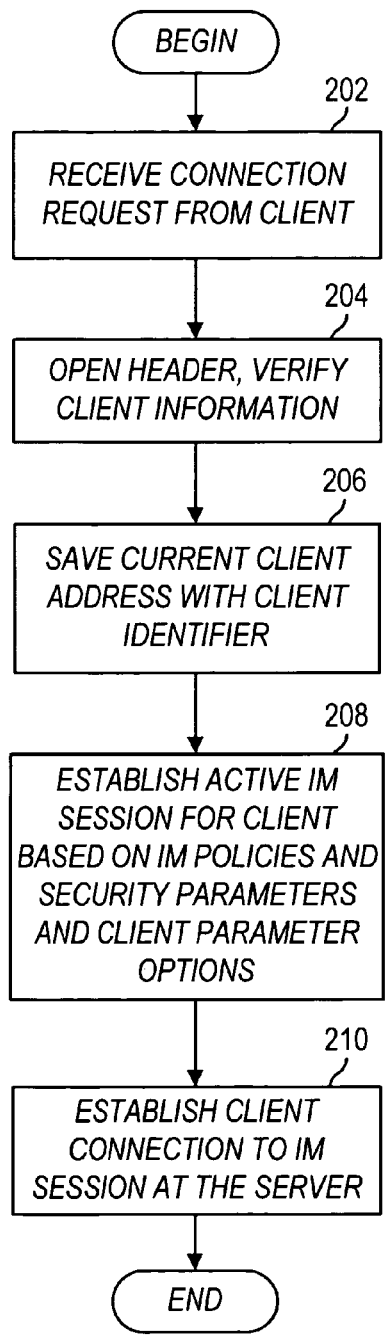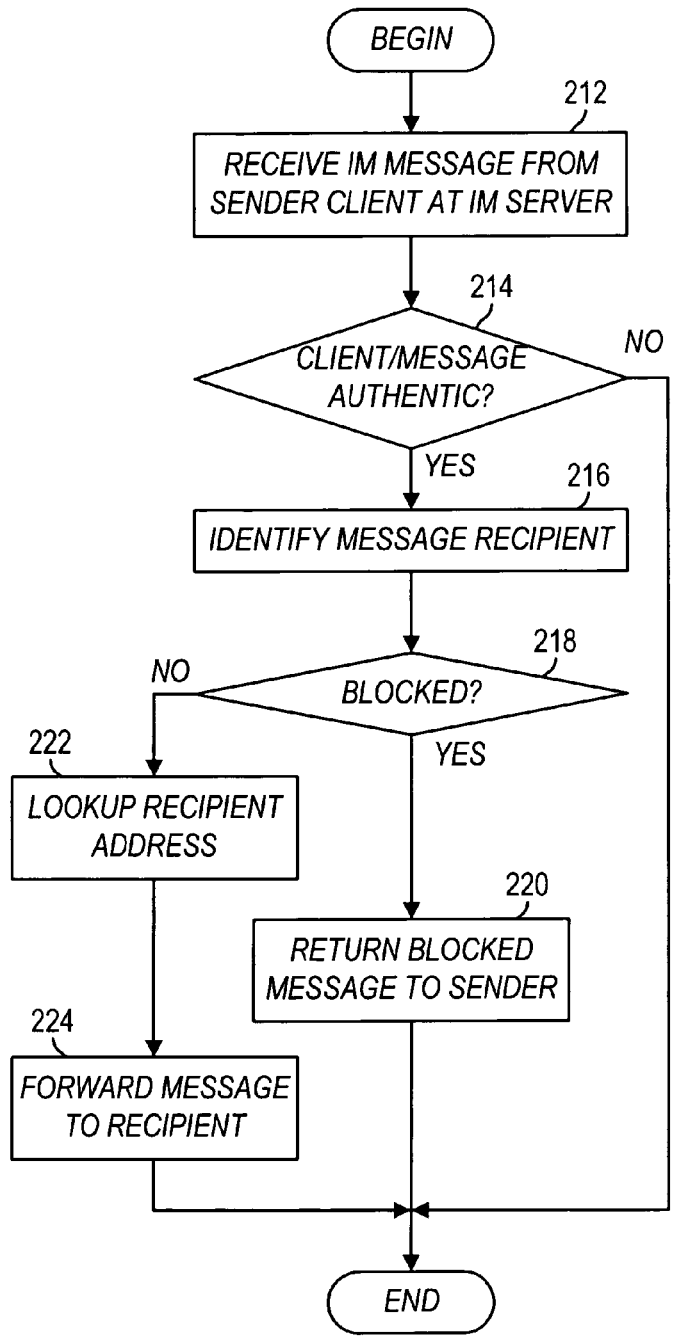
FIG. 2A
PRIOR ART
FIG. 2B
PRIOR ART

OFFLINE IM CHAT TO AVOID SERVER CONNECTIONS

CROSS-REFERENCE TO RELATED APPLICATIONS

This application is a Continuation of U.S. Application No. 11/341,934, filed on Jan. 26, 2006.

BACKGROUND OF THE INVENTION

The present invention relates to instant messaging. More particularly, the present invention relates to taking an instant message chat offline without a connection to an IM server.

Instant messaging (IM) chat is generally recognized as real-time communication between users of network devices, such as computers, cell phones, PDAs or other appliances capable of connecting to a network. A "chat," or chat session, is initially set up through an IM service provider based on the policies and security measures promulgated by that provider. An IM server acts as a security point ensuring that connections are established under the service provider's policies and security measures. Once policy rules and security measures have been met, a chat connection is established between a user's device and an IM server controlled by the IM service provider. The chat connection opens a channel for messaging to and from other IM participants connected to the IM server. The IM server ensures that all of the IM participants comply with the service provider's policies and protects the participants from receiving unauthorized and unwanted messages. Only authorized participants, that is, those participants whose identities are confirmed by the IM server during connection to an IM session, and authorized to connect to the IM server, can send and receive messages across the IM service platform. The IM server ensures that all messages forwarded to an IM participant are from the network device that originally connected to the IM server. Once a chat has been established, the participants use their respective network devices to communicate by text, voice, still images, video, real time video or other media with other participants on their respective network devices. An IM service platform may be a consumer messaging service, such as AOL® Instant Messenger (AIM®) (AOL and AIM are registered trademarks of America Online, Inc. in the United States, foreign countries, or both) and Yahoo!® Messenger (Yahoo! Is a registered trademark of Yahoo! Inc. in the United States, foreign countries, or both), or, alternatively, may be a commercial IM service that is restricted to certain classes of users, such as employees of a particular corporation. Many networks, online services and corporations support IM chat service platforms.

Users of an IM service typically maintain a "buddy list" (or peer list) of the IM participants (buddies) that they consent to receive messages from. This list can be displayed as a graphical user interface (GUI) on the user's device. The display list indicates the current connection status for each of the user's buddies. The IM service provider continually monitors the IM connections to the IM server and notifies all interested IM participants in the event of a change in the connection status for a buddy. When a user initially connects to an IM server, the IM service provider updates user's display list with the current connection status for all of the user's buddies. Buddies can then message each other merely by selecting a name on the list that is currently connected to the IM server.

Chat sessions typically take the form of one-on-one chats or group chats. One-on-one is where a chat session is started by one of the participants who invites the other participant to join the chat. The 'invitation' is frequently just the appearance of a chat screen on the invitees screen. Group chats are similar, but the number of participants is usually greater than two. Most chat sessions are established via server based chat sessions for a variety of reasons, including privacy, the ability to have a record of the conversation, manageability, etc. Server-based chats are usually predicated on a user's buddy list, but may also involve messaging between participants not on each others buddy lists. Each participant in a server-based chat session must indicate a willingness to join the other participants in the messaging session. While security rules and policies vary between IM service providers, in a one-to-one messaging session, both participants must agree to interact in order to establish the session. Once a chat session has been established, the security rules may require that each participant in the private session consent to any other participants joining the private IM session. As can be appreciated, a user can participate in multiple simultaneously ongoing IM sessions.

BRIEF SUMMARY OF THE INVENTION

The present invention is directed to a system, method and software program product for taking an IM chat offline, thereby avoiding server connections. An online instant message connection is initially established at an instant message server. A request is sent to the server for an offline chat. In response, connection information is received from the instant message server for establishing an offline connection. The connection information comprises an address for a client. A message is then sent directly to the client using the address.

BRIEF DESCRIPTION OF THE SEVERAL VIEWS OF THE DRAWINGS

FIG. 2A is a flowchart depicting the method for authorizing an IM connection and session initialization;

FIG. 2B is a flowchart depicting the method for transferring instant messages across the IM system in accordance with the prior art;

Figure 1:
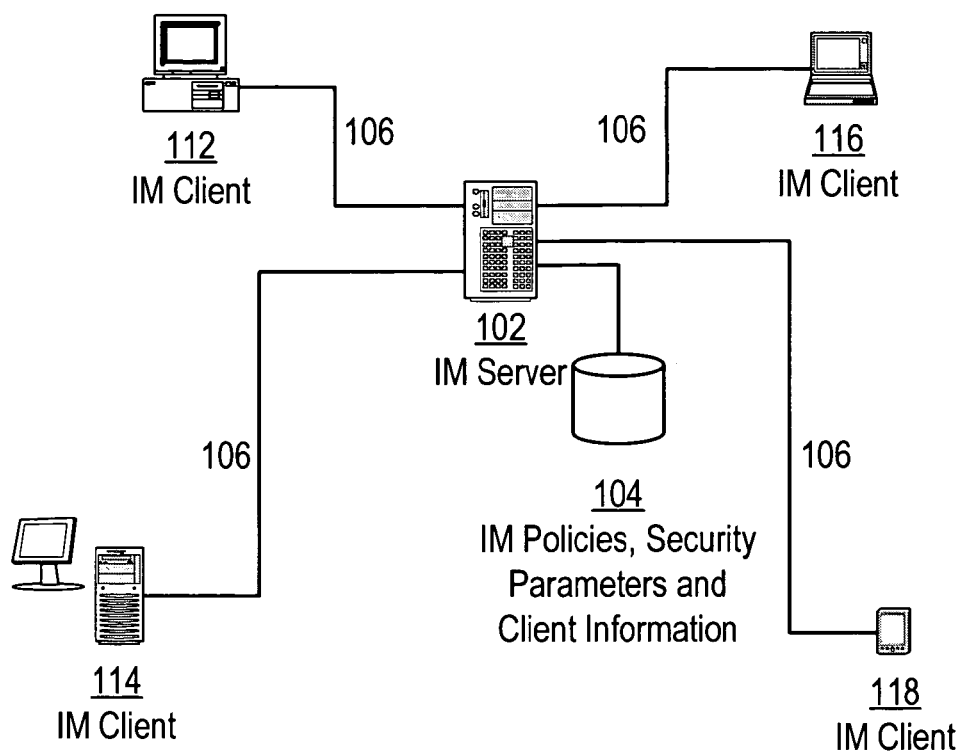
FIG. 1 is a diagram depicting IM network clients and IM connections for an IM chat network as known in the prior art.

Other features of the present invention will be apparent from the accompanying drawings and from the following detailed description.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer usable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Instant message (IM) chats and instant messaging services are well known for generally facilitating the real-time communication between users of network devices. These devices include, but are not limited to, computers, cell phones, PDAs and other appliances capable of connecting to a wired or wireless network. Instant messaging can be a much more efficient communication medium than sending multiple e-mails back and forth and does not suffer from the lag time of email. Furthermore, since a "chat," or chat session, between the participants can be established only under the umbra of a set of policies and security rules implemented by the IM chat service provider, in some cases IM chat is more secure than email from unwanted spam, viruses and other security holes. IM chat, or IM messaging, as discussed herein refers to any communication or conversation between IM clients, such as text, image, animation, video, audio or voice media, or some combination of the above medias.

Before an IM session can be established, all IM participants usually must subscribe to the policies and security rules implemented by the IM service provider and load a specialized IM application for implementing those policies on their respective devices. The IM client application works in conjunction with the IM server to provide security for the IM service and to protect the individual IM participants. For instance, the IM chat service will not authorize an IM client to connect to the IM server unless certain information can be verified for the requestor client, such as the client's identity, by using the client's authorization parameters.

Furthermore, instant messages are exchanged during the IM session in strict accordance with the IM security rules and policies. Much of the IM security is devoted to maintaining the privacy of the individual participants. In contrast to an email application, which the user maintains an address book of names and email addresses, the IM software (local and at the IM server) maintains a list of peers, or "buddies" by their screen names, but only the IM server holds the corresponding addresses for the participants. Thus, for policy and management reasons, IM chat does not support direct messaging between users, even in situations where two users are engaged in a private session. Instead, all instant messages are initially directed to the IM server, which redirects the messages to the addresses of the recipient IM clients.

The present invention is directed to a system, method and software program product for taking an IM chat offline, thereby avoiding server connections. An IM connection is established at an IM server in the usual manner, under the policies and security rules promulgated by the IM service provider. Rather than routing every IM message across the IM server, another session connection is established, and IM chat proceeds offline and directly between consenting IM clients, thereby bypassing the IM server.

A request is received at the IM server for an offline chat session. The request may be in the form of a message, or may instead be in the form of predefined IM session preferences for a client. At least two clients must consent to take the IM chat offline in order to establish the connect end nodes apart from the IM server. Once the IM server is satisfied that at least two clients intend to establish an offline IM chat, the IM server passes a token to each consenting IM client. Each token contains the necessary information to bypass the IM server and communicate IM messages directly, such as the address of the other consenting clients in the offline session, port number, protocol and any security information necessary for establishing the offline session. Using the information from their respective tokens, the IM clients can then establish offline chat connections to one another for passing messages. Because the offline IM chat connection is created using the IM server, and each subsequent message is created, transmitted and received using the client IM application running on the respective clients, the IM policies and security rules implemented by the IM service continue to be observed in the offline chat.

A client may give advanced consent for an offline IM session based on certain conditions, including potential IM server outages, message traffic levels, presence or a threshold security level for other participating clients. For instance, an IM client may give consent to an offline session with the other participants in an ongoing online session in the event of an IM server outage using IM session preferences. The user merely selects the appropriate IM session preference for an offline chat session backup anytime before the IM server becomes unavailable. The IM server acknowledges the clients connected to an online session that opt for an offline session backup and passes tokens to those clients. Each token contains connection information for all other consenting clients in the ongoing IM chat session and policy for establishing an offline chat. Then, if an online chat session is interrupted by a server outage, the clients use the information from their respective tokens to establish an offline session and continue conversing.

Alternatively, a client may select IM session preferences for establishing an offline chat session on the basis of online session performance. There, the IM server will pass tokens to the consenting clients in an ongoing online session in response to a performance degradation from high message traffic at the IM server, or any other performance metric. The consenting clients then establish a high performance offline session. Alternatively, the IM server may distribute the tokens to the clients before any degradation in performance is recognized. Then, if the IM performance declines, the IM server instructs any consenting IM clients connected to an online session to establish an offline chat session.

Clients may also consent to an offline connection based on presence or security. For instance, a client may consent to an offline session with other specified clients or members of a specific group, department or organization that are present in an online chat (or just online). The client identifies clients or groups in the IM session preferences for establishing an offline chat session. A buddy list or peer directory may also be used for identifying clients for an offline session. Assuming the selected clients also consent, the IM server distributes tokens to the respective clients anytime the server senses the presence of both clients online. An offline session is then established automatically without either client making an overt request for an offline session.

Similarly, clients may consent to an offline session in situations where sensitive subject matters are likely to be discussed. The clients may specify other clients, departments, groups or organizations where sensitive conversations are likely to occur. Alternatively, IM client may select a threshold security, clearance or authorization level assigned to a client. Again, assuming those clients with levels that exceed the threshold also consent, the IM server distributes tokens to the respective clients anytime the server senses that both are online or attempting to create an IM session. Thus, a more secure offline session is automatically established where sensitive conversations are likely to occur rather than using the online session across the IM server. Clients that have been accepted access to sensitive materials may have given their de facto consent to participate in offline IM sessions by virtue of their acceptance of the elevated security level.

Offline IM chat, that bypasses the online IM server, operates in one of three principle modes: primary, preferred, or back up. In primary mode, the consenting IM clients intend to take their IM conversation offline and they establish the offline chat connection as the primary IM connection. If the offline IM session is terminated, or allowed to expire, the connection paths are deallocated. In the preferred operating mode, each IM client specifies which type of chat connection it will consent to for a particular peer, client, organization or group. When messaging a specified client, and if that client also consents (or the predetermined IM session preferences specify offline chat), an offline chat connection is automatically established that bypasses the IM server prior to any online IM conversation. Operating in a backup mode involves configuring an offline chat as a contingency, in case of an IM server outage or extreme loading conditions, but not actually establishing the offline session until the occurrence of an event. Then, upon receiving a server unavailable error or the IM server elects to offload some online IM sessions, the respective IM clients immediately establish an offline IM session and continue their chat conversation. At predetermined time intervals, or after a predetermined number of transmissions, the IM clients would attempt to reestablish the IM session through the IM server. When successful, the offline IM connection paths are deallocated and the offline IM chat rolls back to backup status.

FIG. 1 is a diagram depicting IM network clients and IM connections for an IM chat network as known in the prior art. The topology of a prior art IM system is best described as a star network configuration with an active central node. Central to every IM network, is IM server 102 and associated database 104. IM server 102 has at least three separate functions: it evaluates availability and status for establishing an IM session and creates connection to separate network devices 112-118; translates screen names received from sending clients into network addresses for the destination clients for transferring the message, in accordance with TCP/IP or some other network address protocol; and provides firewall and encryption services to protect the privacy of IM users. IM server database 104 stores the IM policies, security rules and client information (necessary for validating IM connection and session initialization requests), other IM preference information and peer lists, and (screen) name-address lookup information (necessary for addressing and forwarding IM messages). Each of IM clients 112-118 runs a local IM application that interacts with an IM application running on IM server 102. The nature of these IM applications differ somewhat between IM service providers, but each require permanent IM connection 106 be established between the respective client (112-118) and IM server 102 prior to commencing IM messaging, and maintained thereafter, and each requires that all IM message traffic pass through the permanent IM online connection. It should be understood that IM connection 106 is permanent only with respect to the ongoing IM session, if the corresponding IM session is terminated, timed-out or otherwise fails, then permanent IM connection 106 is deallocated and evaporates.

FIG. 2A is a flowchart depicting a method for authorizing an IM connection and session initialization and FIG. 2B is a flowchart depicting the method for transferring instant messages across the IM system, both in accordance with the prior art. Before a client can send or receive IM messages within an IM system, a connection to an IM server controlled by the IM service provider is established. The method for establishing the connection with IM server 102 begins with server 102 receiving a request for IM service from one of network clients 112-118 (step 202). As mentioned above, the request is generated by an IM application running on the requesting client, which formats the request and provides the security information necessary for the IM server to recognize and validate the client (step 202). Typically, a service request is automatically generated by the client simultaneous with the client connecting to a network, for instance, to the Internet. The IM server then verifies the information contained in the client request for service (step 204). Typically the verification process validates security information sent to IM server 102 from one of clients 112-118 with corresponding security information stored in IM server database 104. If the security information validates, an IM connection is authorized and an IM session can be established.

However, other, more rigorous security checks may also be made at server 102. For example, the routing information in the message header may be compared to an address for the client address contained in the body of the request message to verify that the IM client is operating from a valid address, or at least the client is messaging from the address that the client asserts in the request. If the addresses do not match, in some instances the IM session will continue, but if the IM session is operating under higher security policies, the session creation may be held in abeyance until the routing information matches the address in the request. In any case, a valid initial address for the IM client is necessary to establish a message route (the client's address may changes thereafter due to dynamic addressing schemes such as DHCP (Dynamic Host Configuration Protocol). Therefore, the current address for the requesting client is extracted from the request message and saved with the requestor's screen name for forwarding messages to the requestor (step 206). Once the client information is verified, IM server 102 reads the set of predetermined client IM parameter options included in the request to the IM server, which includes values for IM parameters such as screen name, buddy (peer) lists, connection speed, media content (e.g., text, VOIP (voice over IP), images, video, graphics, etc.). IM server 102 evaluates the IM session and connection availability, detects the IM client status and open sockets and channels for establishing a new IM session based on the client's IM parameter options. IM server 102 first detects any open session that match the IM parameter options supplied by the client (alternatively, the predetermined IM options for a client may reside in database 104 at IM server 102 and only updated IM parameter options are sent to the IM server). If no such IM session exists, or if the client specifies, a new IM session is established (creating an IM session is often referred to as creating a chat room because of the analogy to maintaining a presence in a virtual room as a venue for communicating in cyberspace). Only when IM server 102 detects that IM resources are currently available and other IM clients consent, will the requestor be allowed to join an open IM session or a new IM session be established for the requestor (step 208). If a new session is established, it is created in accordance with the IM policies and security rules for the IM service. In either case, once the identity of the client is confirmed, and an IM session is authorized, a connection is created at the IM server for the session (step 210). The IM connection and session information for the session may then be passed back to the client and used, for example, for inclusion in headers of IM messages to the IM server. The IM connection information includes the IP address of the IM server (often clusters of IM sessions are established at various IM servers in an attempt to evenly divide the IM traffic between a set of servers, the address of the particular IM server is known after the IM client is verified) and the port number assigned to the session (the combination of port number and IP address is sometimes referred to a "socket").

With a connection to the IM session established at IM server 102, the server will forward messages to the destination IM client(s) from the source IM clients in near real time in the following manner. A typical IM message is received at the IM server (step 212) and is authenticated as coming from an authorized source client (step 214). The IM session identified in the message is also detected by the IM server. If the source client, message or IM session cannot be authenticated, or if the session is closed, the message can not be processed by the IM server, and error message is returned to the source client. The process then ends. If, on the other hand, the message and the source client are authentic, and the IM session is open, the IM server extracts the identity of the destination client from the message (the identity of an IM client is usually a unique screen name created and registered with the particular IM service) (step 216). The identity of the source client is then checked against a "block" list for the destination client. If the source client's identity appears on the block list, than the destination client will not accept IM messages from this client and the source client is notified of the reason for the IM delivery failure (step 220). The destination client's block list is checked prior to forwarding or transferring any message, even in the middle of an IM session, because the destination IM client may block a user at any time, even in the middle of a session. If, on the other hand, the source client's message is not blocked, the IM server looks up the destination client's address by the screen name registered for the destination IM client (step 222), addresses the message with the address and forwards the message to the destination client (step 224). The IM server's responsibilities are then complete for the message.

As might be appreciated from the foregoing, supporting an IM service requires a substantial commitment by the IM service provider to IM server capacity, which to a large extent, is devoted to the repetitive processing IM messages for ongoing sessions. Client validation and connection tasks require far less server capacity. Consumer messaging services take advantage of this situation by including sponsor paid advertising, banners and other promotions in the IM messages. It is, therefore, sometime advantageous to route all IM messages through the dedicated IM server controlled by the IM service provider. The server system has the drawback of increasing message traffic on a network by 100% since every IM message results in one IM message from the source client to the IM server and a second IM message from the IM server to the destination client.

Routing every IM message through the IM server has at least two other distinct disadvantages: performance bottlenecks and server outages. IM message traffic sometimes bottlenecks at an IM server. The bottleneck issues can be alleviated, somewhat, by dividing the IM traffic evenly among a group of IM servers, by using some type of clustering, i.e., by session, source, client or loading. Clustering may be static, where the session, source or client is assigned to a particular IM server simultaneously for the creation of a connection, or may be dynamic where first node server directs each message to a processing server based on current loading conditions. In either case, if the IM server with the responsibility for processing messages fails, the IM connection is lost. In the worst case, a first node outage affects all of the other nodes and the IM service fails.

The present invention may include taking an IM chat offline, thereby avoiding server connections. In accordance with one exemplary embodiment of the present invention, an IM connection is established at an IM server in the manner discussed above, but then, rather than routing every IM message across the IM server, another session connection is established, an offline connection, and the IM chat proceeds directly between consenting IM clients, thereby bypassing the server. Essentially, clients in an IM session (or those establishing a session) must consent to take the IM chat offline. Once the IM server is satisfied that both clients intend to establish an offline IM chat, the IM server passes a token to each client. The token contains the information necessary to bypass the IM server and connect directly to a client, such as the address of the other clients in the offline session, port numbers, protocol, encryption information and security information. The clients can then establish an offline connection directly between one another and IM messages are then passed over that connection. Because the offline connection is created using the IM server and each subsequent message is created, transmitted and received using the client IM application running on the respective clients, the IM policies and security rules are observed, even with the IM server being bypassed.

In accordance with another exemplary embodiment of the present invention, the clients may consent for an offline session in advance. In these situations, consent is manifested by the clients' IM session preferences. The IM session preferences are maintained by the IM server and offline connections can then be established automatically, without any further interaction from the client.

Consent for establishing an offline session may be predicated on a number of factors, for example, avoiding interruptions due to IM server outages or high message traffic, the presence of a specified client or group member, or security issues. A client may give consent to connect to an offline session in the event of an IM server outage by defining the IM session preferences accordingly. In response, the IM server passes tokens to the client with the connection and policy information for each consenting client in an ongoing chat session. If a session is interrupted by a server outage, the clients use the information in their respective tokens to establish an offline session and continue conversing. A client may also define their IM session preferences for optimizing IM service. In that case, the client consents to an offline connection based on session performance. If the IM server senses that response time is decreasing and lag time increasing, it will offload chat sessions to alleviate the performance issues. The IM server passes tokens to the consenting clients in one or more IM sessions until the IM performance increases. The remaining chats stay online, unless further service degradation is sensed, and then other consenting clients engaged in online chat session are offloaded. Once again, the tokens may be passed to the clients just prior to their respective session going offline or in advance, followed by an authorization from the IM server to proceed offline.

Clients may consent to an offline connection based on the presence of other consenting clients or groups in a session. A client identifies other clients or members of a group for an offline session. Assuming those clients also consent, the IM server passes tokens to the respective clients anytime the IM server senses the presence of both, i.e., both are online. An offline session is then established between the clients automatically, that is without either consenting client making an overt request for the offline session. Clients may also grant consent to an offline session only where security is an issue, for example, in conversations where sensitive subject matters are likely to be discussed. The client specifies other clients, departments, groups or organizations where sensitive conversation will likely take place and grants consents to offline sessions with them, such as a corporate attorney. Assuming those clients also consent to go offline, the IM server passes tokens to the respective clients anytime the server senses that both are online or attempting to create a session. Thus, a more secure offline session is automatically established rather than the online session through the IM server. Alternatively, consent to an offline session may be based solely on the security, clearance or authorization level assigned to a client. De facto consent to conversing in an offline IM session is created by a client accepting elevated access to sensitive information or by accepting an elevated security rating. The IM server would then arbitrate between clearance levels of clients for establishing online and offline IM sessions. Under certain circumstances, establishing an online IM session between clients with high clearances might be forbidden.

Figure 3:
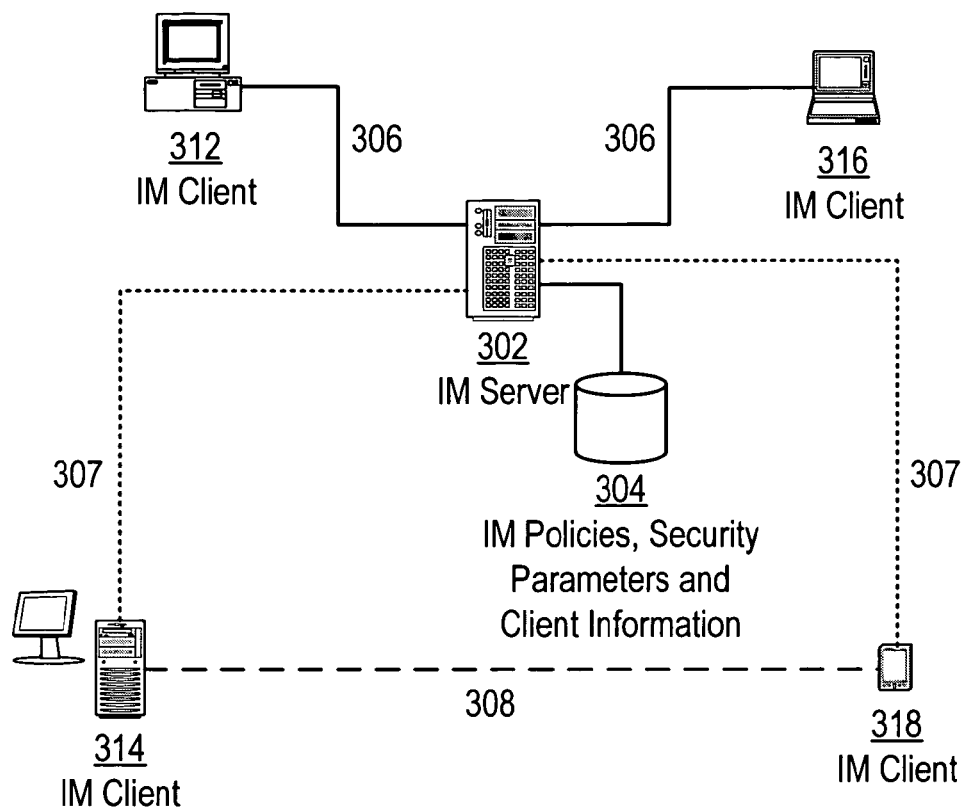
FIG. 3 is a diagram depicting IM network clients and IM connections for an offline IM chat between two IM clients in accordance with another exemplary embodiment of the present invention.

FIG. 3 is a diagram depicting IM network clients and IM connections for an offline IM chat between two IM clients in accordance with another exemplary embodiment of the present invention. As discussed above, the topology of the present IM system is reminiscent of a star network configuration, but operationally, not all IM messages traverse IM server 302. IM server 302, and associated database 304, continue to support establishing IM connections to network devices via paths 306, translating screen names into network addresses for destination IM clients and provide isolation between IM clients, but in addition IM server 302 also establishes offline IM chat paths between consenting IM clients, such as offline IM chat path 308 between IM client 314 and IM client 318. Notice that even though path 308 had been created between the respective IM clients for an offline chat, paths 307 may remain, depending on the operational mode selected.

Figure 4:
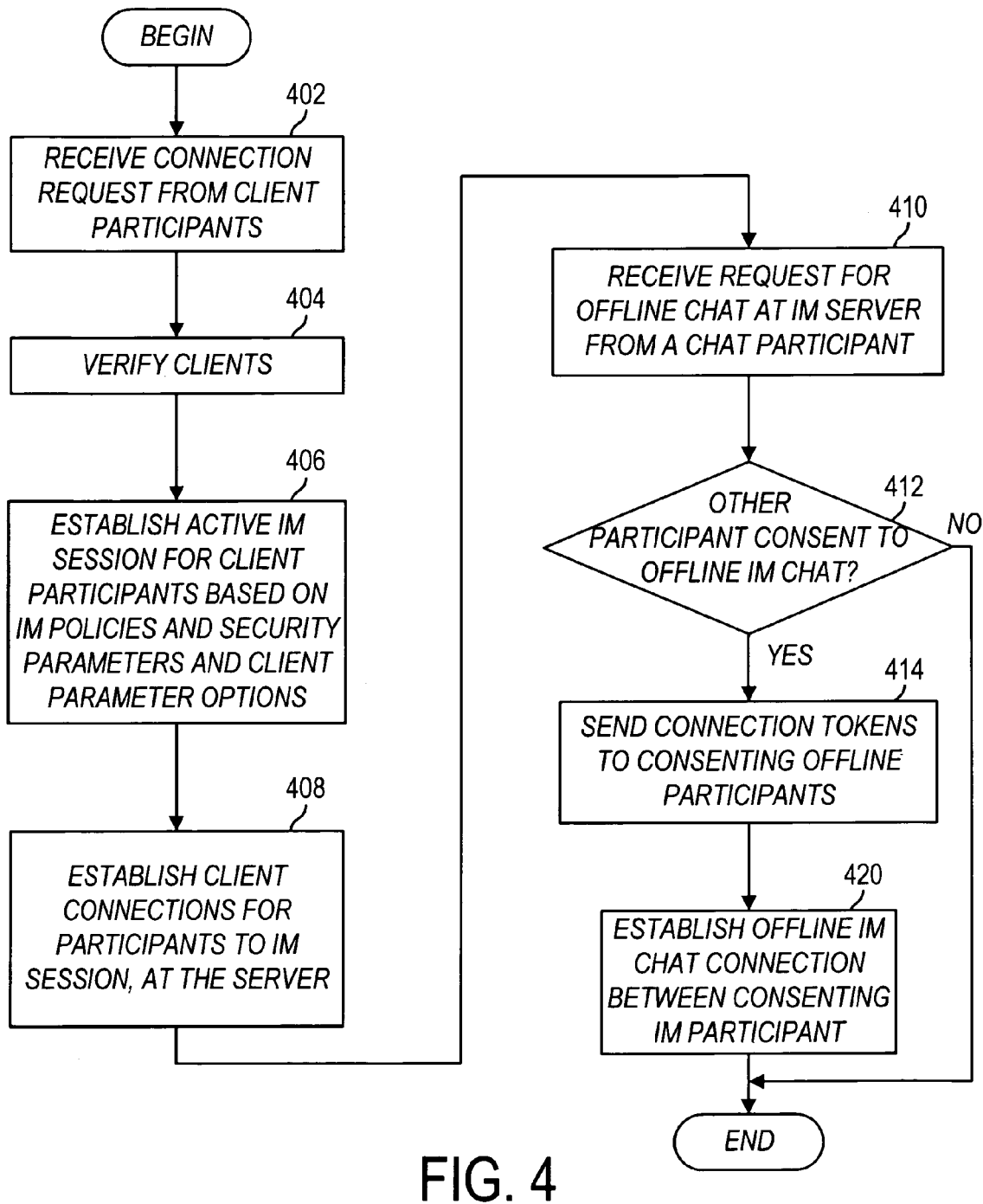
FIG. 4 is a flowchart depicting the method for creating an offline IM chat connection directly between two IM clients and thereby bypassing the IM server in accordance with an exemplary embodiment of the present invention.

FIG. 4 is a flowchart depicting the method for creating an offline IM chat connection directly between two IM clients and thereby bypassing the IM server in accordance with an exemplary embodiment of the present invention. The process begins by establishing a connection with IM server 302 similarly as discussed above with regard to FIG. 2A. Here though, a connection to IM server 302 may be created primarily to utilize the IM server for creating an offline chat connection rather than for IM messaging. The IM server receives a request for IM service from a network client (step 402), verifies the client from the information contained in the client connection request (step 404). Optionally, an IM session is then commenced, and the source client's current address is extracted from the message and saved with the source screen name (step 406). The IM connection is then created between the IM client and the IM server in accordance with the IM policies and security rules for the IM service (step 408).

It should be understood that any single IM client can establish an IM session and/or create an IM connection to an existing IM session at an IM server, with which no other client is connected to exchange IM messages. Conversely, establishing an offline chat connection requires at least two consenting clients to form the offline chat nodes. Thus, in establishing an offline chat connection, the IM server will receive an offline chat request that identifies both participating IM clients (step 410). This request may be an actual request from a chat participant to go offline, or may be based on predefined IM session preferences for the client. The IM server queries the non-requesting client for consent (step 412), and if consent is given, the IM server passes a token to each IM client with the address of the consenting client, IM parameter options, and other connection and security information (step 414). Here again, the query may merely involve accessing the non-requesting client's IM session preferences.

An offline IM session need not be created immediately. If the non-requesting client is unavailable, i.e., offline, the IM server may access that client's IM preferences stored in database 304. If the non-requesting IM client has previously consented to an offline chat with the requestor client, the IM server may pass a token to the requestor and attempt to pass the second token to the non-requestor client. If unsuccessful, the IM server will pass the token when the non-requestor client goes online. In any case, using the local IM application running on each client, the clients then establish an offline chat IM connection path that bypasses the IM server (step 420). The clients establish an IM offline chat session based on a set of predetermined client IM parameter options. Thus, although the IM server is circumvented, the policies and security rules of the IM service are observed.

Optionally, the offline IM chat may operate in one of three modes: primary, preferred, or back up. In primary mode, the consenting IM clients intend to take their IM conversation offline and they establish the offline chat connection as the primary IM connection. The IM session with the IM is terminated, or allowed to expire, and connection paths 307 are deallocated. With respect to the preferred operating mode, each IM client specifies which type of chat connection it will consent to for a particular peer client. For example, an IM client may specify an offline chat connection for any client in the corporate legal department as the preferred IM connection type. Thus, when messaging an in-house attorney, and if the attorney consents (or the predetermined IM session preferences specify offline chat), an offline chat connection is automatically established that bypasses the IM server prior to any IM conversation. Finally, the offline IM chat may operate in a backup mode, whereby the offline chat mode is established as a backup in case of an IM server outage or loading conditions. In that case, the respective IM client would immediately begin an offline IM chat conversation upon receiving a server unavailable error or the server elects to offload some online IM session offline. At predetermined time intervals, or after a predetermined number of transmissions, the IM client would attempt to reestablish the IM session through the IM server. When successful, the offline IM chat connect reverts to backup status.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. An instant message server, comprising:
   at least one hardware processor, wherein the at least one processor is configured to initiate and/or perform:
   creating, in response to a connection request received from a first computer client,
   a connection between the first computer client and a second computer client;
   receiving a request for an offline session between the first computer client and the second computer client; and
   forwarding a token to each of both the first computer client and the second computer client, wherein the first and second computer clients are both compliant with the instant message server, and
   the offline session is created between the first computer client and the second computer client by using the token and bypassing the instant message server.

2. The server of claim 1, wherein
   the forwarding is conditional upon a detection of a predefined performance metric associated with the instant message server.

3. The server of claim 1, wherein
   an authorization to create the offline session is forwarded, separately from each of the tokens, to the first computer client and the second computer client.

4. The server of claim 1, wherein
   consent is received, from the first computer client, to automatically initiate the offline session based upon at least one factor.

5. The server of claim 4, wherein
   the at least one factor is selected from the group consisting of:
   identity of the second computer client,
   a security level of the second computer client, and
   a predefined performance metric associated with the instant message server.

6. The server of claim 1, wherein
   the forwarding is conditional upon consent for the offline session being received from both the first computer client and the second computer client.

7. The server of claim 1, wherein
   the token for the second computer client is sent to the second computer client in a different transaction than the token for the first computer client is sent to the first computer client based upon an online status of the second computer client.

8. A first computer client, comprising:
   at least one hardware processor, wherein the at least one processor is configured to initiate and/or perform:
   connecting, via an instant message server, to a second computer client based upon a connection request submitted to the instant message server;
   receiving a token from the instant message server; and
   creating an offline session by directly connecting, using the token and bypassing the instant message server, to the second computer client,
   wherein the first and second computer clients are both compliant with the instant message server.

9. The first computer client of claim 8, wherein
   a creation of the offline session is conditional upon a detection of an outage within the instant message server.

10. The first computer client of claim 8, wherein
    a creation of the offline session is conditioned upon a predefined performance metric associated with the instant message server.

11. The first computer client of claim 8, wherein
    a creation of the offline session is conditioned upon security levels, respectively, of the first computer client and the second computer client.

12. The first computer client of claim 8, wherein
a creation of the offline session is conditioned upon receipt of an authorization from the instant message server subsequent to the token being received.

13. The first computer client of claim 8, wherein the at least one processor is configured to initiate and/or perform:
   forwarding a consent, to the instant message server, to automatically initiate the offline session based upon at least one factor.

14. The first computer client of claim 13, wherein
the at least one factor is selected from the group consisting of:
   identity of the second computer client,
   a security level of the second computer client, and
   a predefined performance metric associated with the instant message server.

15. A computer program product, comprising:
   a computer-usable storage device having stored therein computer-usable program code, which when executed by an instant message server, causes the instant message server to perform:
      creating, in response to a connection request received from a first computer client, a connection between the first computer client and a second computer client;
      receiving a request for an offline session between the first computer client and the second computer client; and
      forwarding a token to each of both the first computer client and the second computer client, wherein
   the first and second computer clients are both compliant with the instant message server,
   the offline session is created between the first computer client and the second computer client by using the token and bypassing the instant message server, and
   the computer-usable storage device does not consist of a transitory, propagating signal.

16. The computer program product of claim 15, wherein
the forwarding is conditional upon a detection of a predefined performance metric associated with the instant message server.

17. The computer program product of claim 15, wherein
an authorization to create the offline session is forwarded, separately from each of the tokens, to the first computer client and the second computer client.

18. The computer program product of claim 15, wherein
consent is received, from the first computer client, to automatically initiate the offline session based upon at least one factor.

19. The computer program product of claim 18, wherein
the at least one factor is selected from the group consisting of:
   identity of the second computer client,
   a security level of the second computer client, and
   a predefined performance metric associated with the instant message server.

20. The computer program product of claim 15, wherein
the forwarding is conditional upon consent for the offline session being received from both the first computer client and the second computer client.

* * * * *